(12) United States Patent
Todaka et al.

(10) Patent No.: US 12,206,317 B2
(45) Date of Patent: Jan. 21, 2025

(54) WATER JACKET AND WATER JACKET PRODUCTION METHOD

(71) Applicant: HONDA MOTOR CO., LTD., Tokyo (JP)

(72) Inventors: Hirosumi Todaka, Saitama (JP); Yasunari Kimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 18/165,940

(22) Filed: Feb. 8, 2023

(65) Prior Publication Data
US 2023/0353018 A1 Nov. 2, 2023

(30) Foreign Application Priority Data
Mar. 31, 2022 (JP) .................................. 2022-057989

(51) Int. Cl.
*H02K 9/19* (2006.01)
(52) U.S. Cl.
CPC ...................................... *H02K 9/19* (2013.01)
(58) Field of Classification Search
CPC .......... H02K 9/19; H02K 5/203; B22F 10/28; F28D 1/05333
USPC ....................................................... 165/80.4
See application file for complete search history.

(56) References Cited

U.S. PATENT DOCUMENTS

| | | | | |
|---|---|---|---|---|
| 7,455,467 | B2* | 11/2008 | Sasaki | A45D 40/205 |
| | | | | 401/75 |
| 9,775,422 | B2* | 10/2017 | Ishida | A45D 40/20 |
| 10,299,564 | B2* | 5/2019 | Ishida | A45D 40/12 |
| 11,274,830 | B2* | 3/2022 | Miyamoto | F02C 3/14 |
| 12,130,094 | B2* | 10/2024 | Todaka | F28F 13/12 |
| 2017/0000240 | A1* | 1/2017 | Tani | A45D 40/06 |
| 2017/0340088 | A1* | 11/2017 | Ishida | A45D 40/12 |
| 2019/0072056 | A1* | 3/2019 | Yoon | F02M 26/19 |
| 2023/0129855 | A1* | 4/2023 | Todaka | F02F 1/14 |
| | | | | 123/41.72 |

FOREIGN PATENT DOCUMENTS

JP 2022119019 A 8/2022

* cited by examiner

*Primary Examiner* — Jon T. Schermerhorn, Jr.
(74) *Attorney, Agent, or Firm* — CKC & Partners Co. LLC

(57) ABSTRACT

A cooling fluid flow channel inside a housing includes: a plurality of main flow channel pipes each disposed adjacent to the outer surface of the heat generating part, and each arranged along the outer surface of the heat generating part; an inflow-side collecting pipe; and an outflow-side collecting pipe. The plurality of main flow channel pipes each have, in its inside and adjacent to each of the upstream-side ends, a swirl generator. The swirl generator has a plurality of protrusions respectively disposed, along an inner wall surface of each of the main flow channel pipes and respectively protruding toward a center, in radial directions, of each of the main flow channel pipes. The plurality of protrusions respectively have tips being separated from each other to have a through flow channel allowing the cooling fluid, in the radial directions, of each of the main flow channel pipes.

4 Claims, 4 Drawing Sheets

WATER JACKET AND WATER JACKET PRODUCTION METHOD

This application is based on and claims the benefit of priority from Japanese Patent Application No. 2022-057989, filed on 31 Mar. 2022, the content of which is incorporated herein by reference.

BACKGROUND OF THE INVENTION

Field of the Invention

The present invention relates to a water jacket and a water jacket production method.

Related Art

Conventionally, there has been known a water jacket provided around a peripheral surface of a stator housing of an electric motor (for example, see Japanese Unexamined Patent Application, Publication No. 2002-119019). This water jacket is provided with a turbulent flow generating member at an inlet through which a cooling fluid flows into a cooling fluid jacket. The turbulent flow generating member generates turbulent flows in the cooling fluid flowing into the cooling fluid jacket to allow the cooling fluid to flow into the cooling fluid jacket substantially evenly, improving the cooling efficiency.

Patent Document 1: Japanese Unexamined Patent Application, Publication No. 2002-119019

SUMMARY OF THE INVENTION

In the water jacket according to the prior art described above, the cooling fluid jacket, which is wide in width, extends in circumferential directions of the stator housing that is regarded as a heat generating part to surround it. Therefore, with the water jacket according to the prior art described above, even when the turbulent flow generating member has generated turbulent flows in the cooling fluid flowing into the cooling fluid jacket, the effects of the turbulent flows decrease as the cooling fluid flows into the flow channel of the cooling fluid jacket that is curved in the circumferential directions of the stator housing. Therefore, there is a need for improvements in terms of effectively performing cooling across a whole cooling fluid jacket.

In view of the issues described above, an object of the present invention is to provide a water jacket and a production method for the water jacket, which make it possible to further improve the cooling efficiency of a heat generating part.

(1) A water jacket according to the present invention is directed to a water jacket (for example, a water jacket 1 described later) including a cooling fluid flow channel (for example, a cooling fluid flow channel 3 described later) inside a housing (for example, a housing 2 described later) disposed around an outer surface of a heat generating part (for example, a stator core 101 described later). The cooling fluid flow channel includes: a plurality of main flow channel pipes (for example, main flow channel pipes 31 described later) each disposed adjacent to the outer surface of the heat generating part, each extending linearly, and each arranged along the outer surface of the heat generating part; an inflow-side collecting pipe (for example, an inflow-side collecting pipe 32 described later) coupling upstream-side ends (for example, upstream-side ends 31*a* described later) of the plurality of main flow channel pipes to each other to allow a cooling fluid to flow thereinto; and an outflow-side collecting pipe (for example, an outflow-side collecting pipe 33 described later) coupling downstream-side ends (for example, downstream-side ends 31*b* described later) of the plurality of main flow channel pipes to each other to allow the cooling fluid to flow thereout. The plurality of main flow channel pipes each have, in its inside and adjacent to each of the upstream-side ends, a swirl generator (for example, a swirl generator 4 described later) that deflects a flow of the cooling fluid in one of circumferential directions of each of the main flow channel pipes to generate swirls. The swirl generator has a plurality of protrusions (for example, deflecting plates 41 described later) respectively disposed, in the circumferential directions (for example, D4 directions described later), along an inner wall surface (for example, an inner wall surface 31*c* described later) of each of the main flow channel pipes and respectively protruding toward a center, in radial directions (for example, D5 directions described later), of each of the main flow channel pipes. The plurality of protrusions respectively have tips (for example, tips 41*a* described later) being separated from each other to have, adjacent to the tips of the plurality of protrusions, a through flow channel (for example, a through flow channel 41*e* described later) allowing the cooling fluid to flow along the center, in the radial directions, of each of the main flow channel pipes.

(2) In the water jacket described in (1) above, the plurality of protrusions may be each formed into a tapered shape extending from the inner wall surface of each of the main flow channel pipes toward the tip.

(3) In the water jacket described in (1) or (2) above, the swirl generator may have, between each adjacent two of the protrusions in the circumferential directions of each of the main flow channel pipes, a gap flow channel (for example, a gap flow channel 41*f* described later) communicating an upstream side and a downstream side of the swirl generator in extending directions of each of the main flow channel pipes and being in communication with the through flow channel.

(4) A water jacket production method according to the present invention uses a metal material in laminate forming to integrally form the water jacket described in any one of (1) to (3) above.

According to (1) described above, the plurality of protrusions of the swirl generator, which protrude from the inner wall surface of each of the main flow channel pipes toward the center makes it possible to generate swirls in each of the main flow channel pipes. Thereby, the thermal transfer of the cooling fluid flow channel improves, making it possible to further improve the cooling efficiency of the heat generating part. Furthermore, since the tips of the plurality of protrusions are separated from each other, the through flow channel allowing the cooling fluid to flow therein is formed at the center, in the radial directions, of each of the main flow channel pipes. Thereby, the cooling fluid is able to smoothly pass through the main flow channel pipes, suppressing, for example, concentrated stress generated at the protrusions due to external forces and other forces acting onto the housing. Therefore, it is possible to provide a highly durable, high quality water jacket.

According to (2) described above, the protrusions are formed into a tapered shape toward the center of each of the main flow channel pipes, making it possible to reduce resistance when the cooling fluid passes through the flow channel. Therefore, the cooling fluid is able to further smoothly pass through the main flow channel pipes.

According to (3) described above, having the gap flow channels each between each adjacent two of the protrusions in the circumferential directions of each of the main flow channel pipes, the gap flow channels each being in communication with the through flow channel, makes it possible to reduce resistance when the cooling fluid entering the flow channel passes through the swirl generator. Therefore, the cooling fluid is able to further smoothly pass through the main flow channel pipes.

According to (4) described above, it is possible to easily produce, using a 3D printer, a water jacket that makes it possible to further improve the cooling efficiency of a heat generating part. Furthermore, swirls to be generated in the main flow channel pipes by the swirl generators improve ease of removal of metal material remaining in the cooling fluid flow channel after being formed.

DETAILED DESCRIPTION OF THE INVENTION

Figure 1:
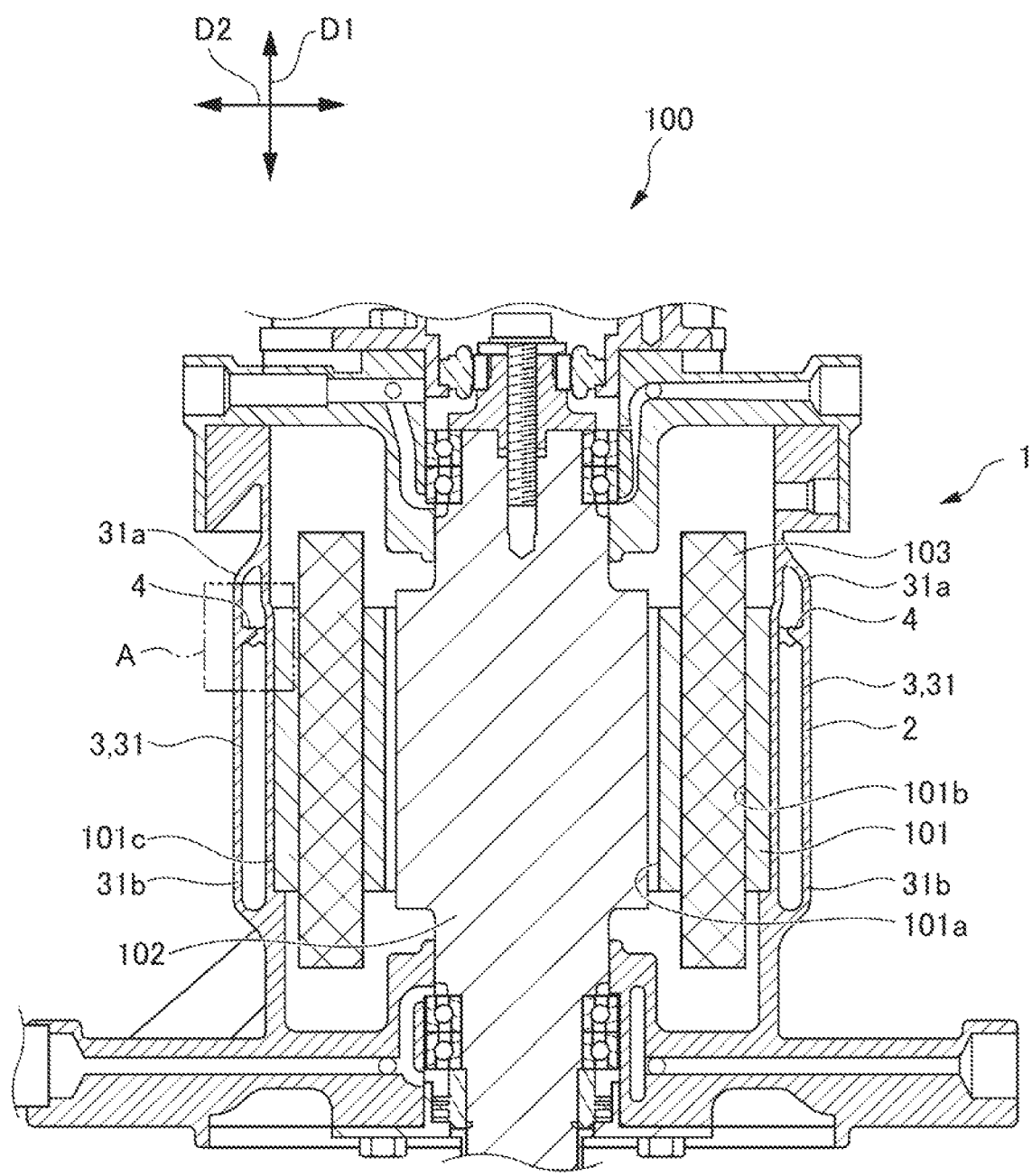
FIG. 1 is a vertical cross-sectional view illustrating an electric motor provided with a water jacket according to the present embodiment.

An embodiment of the present invention will now be described herein in detail with reference to the accompanying drawings. FIG. illustrates an electric motor 100 including a water jacket 1 according to the present embodiment. In FIG. 1, D1 directions illustrated by arrows represent axial directions of the electric motor 100, and D2 directions represent radial directions of the electric motor 100.

The electric motor 100 includes a stator core 101 having a substantially cylindrical shape extending in the axial directions and a rotor 102 rotatably supported in a shaft hole 101a of the stator core 101. The stator core 101 is made of a ferrous metal material and accommodates coils 103 in a plurality of slots 101b.

As the electric motor 100 is driven, heat generated in the coils 103 is transferred to the stator core 101, heating the stator core 101. In the present embodiment, the stator core 101 is regarded as a heat generating part that is subject to cooling by the water jacket 1. The water jacket 1 cools the coils 103 via the stator core 101.

The water jacket 1 is disposed around an outer side, in the radial directions, of the stator core 101 in the electric motor 100. The water jacket 1 includes a housing 2 disposed around an outer periphery of the stator core 101 and a cooling fluid flow channel 3 provided inside the housing 2 and having a tubular shape into which a cooling fluid flows to cool the stator core 101.

The housing 2 is made of such a metal material that offers higher thermal conductivity such as an aluminum-based material or a copper-based material, and has a shape surrounding the whole outer periphery of the stator core 101. The housing 2 is thermally coupled to an outer peripheral surface 101c of the stator core 101. The housing 2 according to the present embodiment is in direct contact with the outer peripheral surface 101c of the stator core 101. However, the housing 2 may be coupled, via a material that is able to transfer heat such as a thermo-conductive medium containing metal micro-particles, to the outer peripheral surface 101c of the stator core 101.

Figure 2:
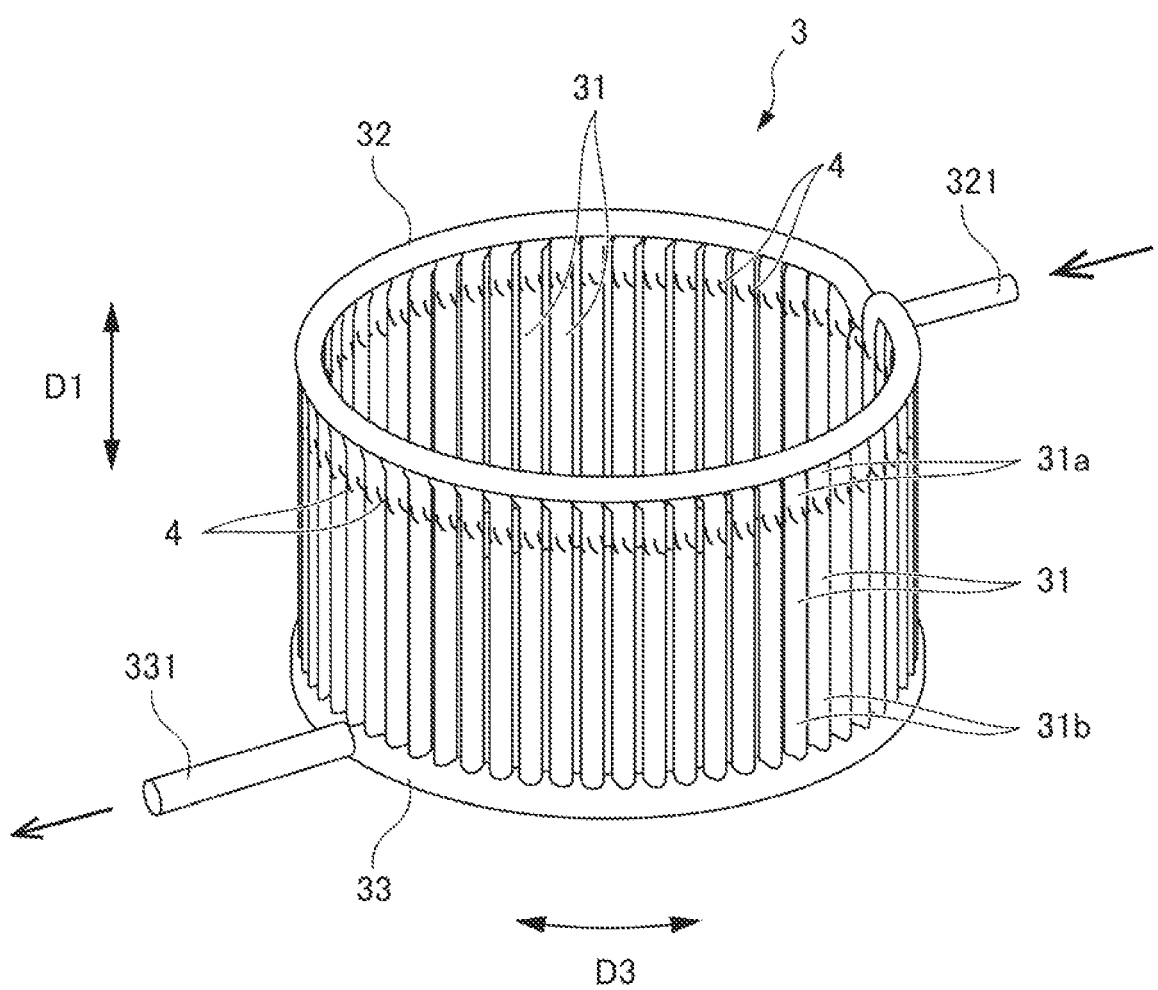
FIG. 2 is a perspective view illustrating only a cooling water flow channel in the water jacket according to the present embodiment.

As illustrated in FIG. 2, the cooling fluid flow channel 3 into which the cooling fluid flows is formed inside the housing 2. The cooling fluid flow channel 3 includes a plurality of main flow channel pipes 31, at least one inflow-side collecting pipe 32, and at least one outflow-side collecting pipe 33.

The main flow channel pipes 31 are disposed adjacent to the outer peripheral surface 101c of the stator core 101. The plurality of main flow channel pipes 31 according to the present embodiment respectively linearly extend in the axial directions of the stator core 101. However, the plurality of main flow channel pipes 31 may be provided to respectively extend in the circumferential directions of the stator core 101. Inside the housing 2, the plurality of main flow channel pipes 31 are arranged in parallel to each other at constant gaps in D3 directions along the outer periphery of the stator core 101 to surround the stator core 101. The main flow channel pipes 31 according to the present embodiment are respectively configured to allow the cooling fluid to flow from the top toward the bottom in FIGS. 1 and 2, i.e., in one of the axial directions of the stator core 101.

The inflow-side collecting pipe 32 is provided in an annular shape along the outer periphery of the stator core 101. The inflow-side collecting pipe 32 is coupled to upstream-side ends 31a of all the main flow channel pipes 31 separately and is internally in communication with the main flow channel pipes 31 respectively. As illustrated in FIG. 2, the inflow-side collecting pipe 32 is coupled to at least one inflow pipe 321 allowing the cooling fluid to flow into the cooling fluid flow channel 3.

The outflow-side collecting pipe 33 is provided in an annular shape along the outer periphery of the stator core 101, similarly to the inflow-side collecting pipe 32. The outflow-side collecting pipe 33 is coupled to downstream-side ends 31b of all the main flow channel pipes 31 separately and is internally in communication with the main flow channel pipes 31 respectively. As illustrated in FIG. 2, the outflow-side collecting pipe 33 is coupled to at least one outflow pipe 331 allowing the cooling fluid to flow out the cooling fluid flow channel 3.

Inside each of all the main flow channel pipes 31, a swirl generator 4 is provided to generate swirls in the cooling fluid passing through each of the main flow channel pipes 31. The swirl generator 4 is disposed, as illustrated in FIGS. 1 and 2, inside an area adjacent to each of the upstream-side ends 31a of the main flow channel pipes 31. With this swirl generator 4 provided in each of the main flow channel pipes 31, it is possible to easily generate swirls in each of the main flow channel pipes 31. Therefore, the thermal transfer of the cooling fluid flow channel 3 is improved. Thereby, the temperature gradient in each of the main flow channel pipes 31 is considerably reduced, further improving the cooling efficiency of the stator core 101 that is regarded as a heat generating part.

Figure 3:
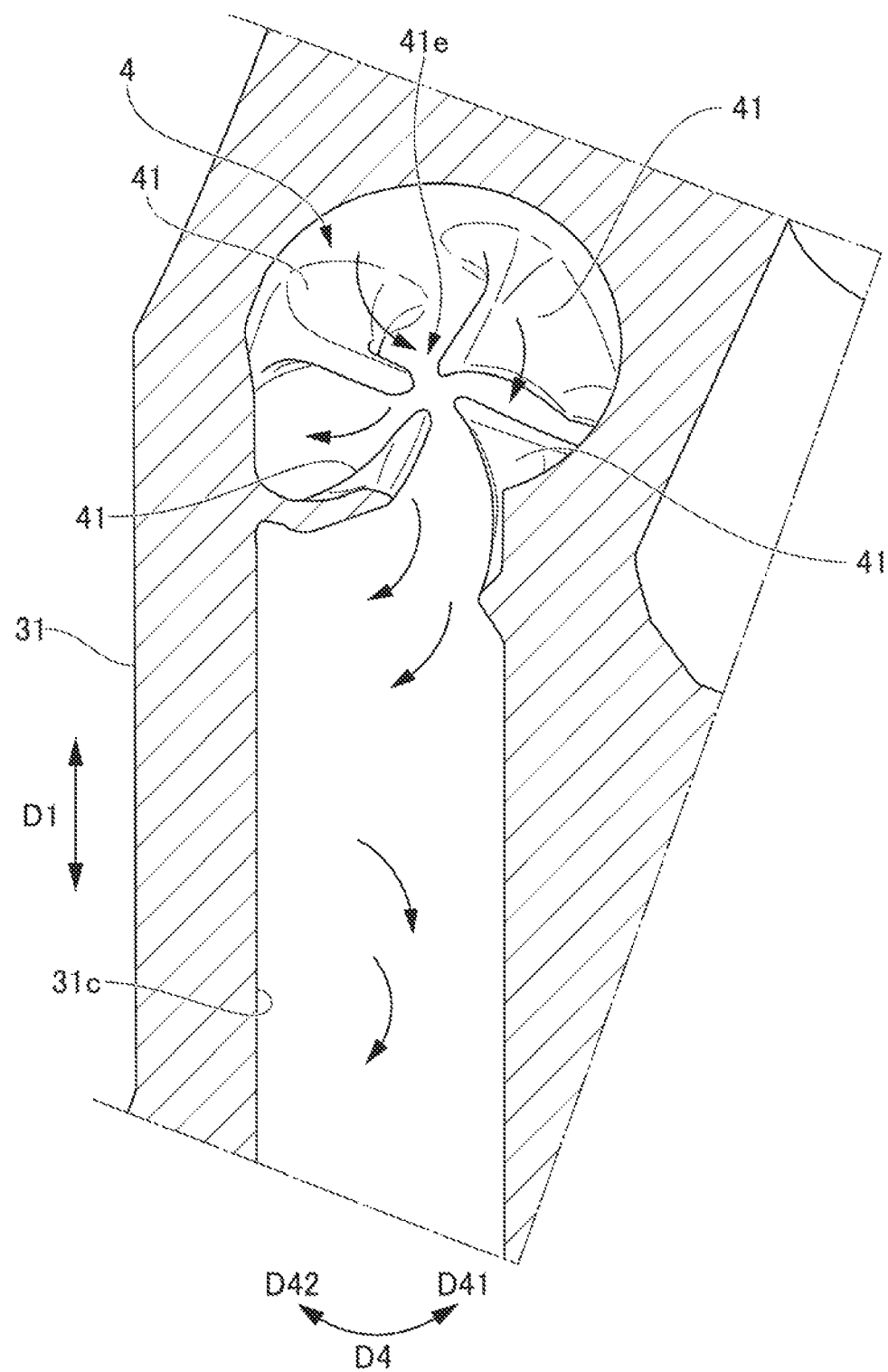
FIG. 3 is a perspective view illustrating in a partially cut manner a swirl generator in a main flow channel pipe in Part A in FIG. 1.
Figure 4:
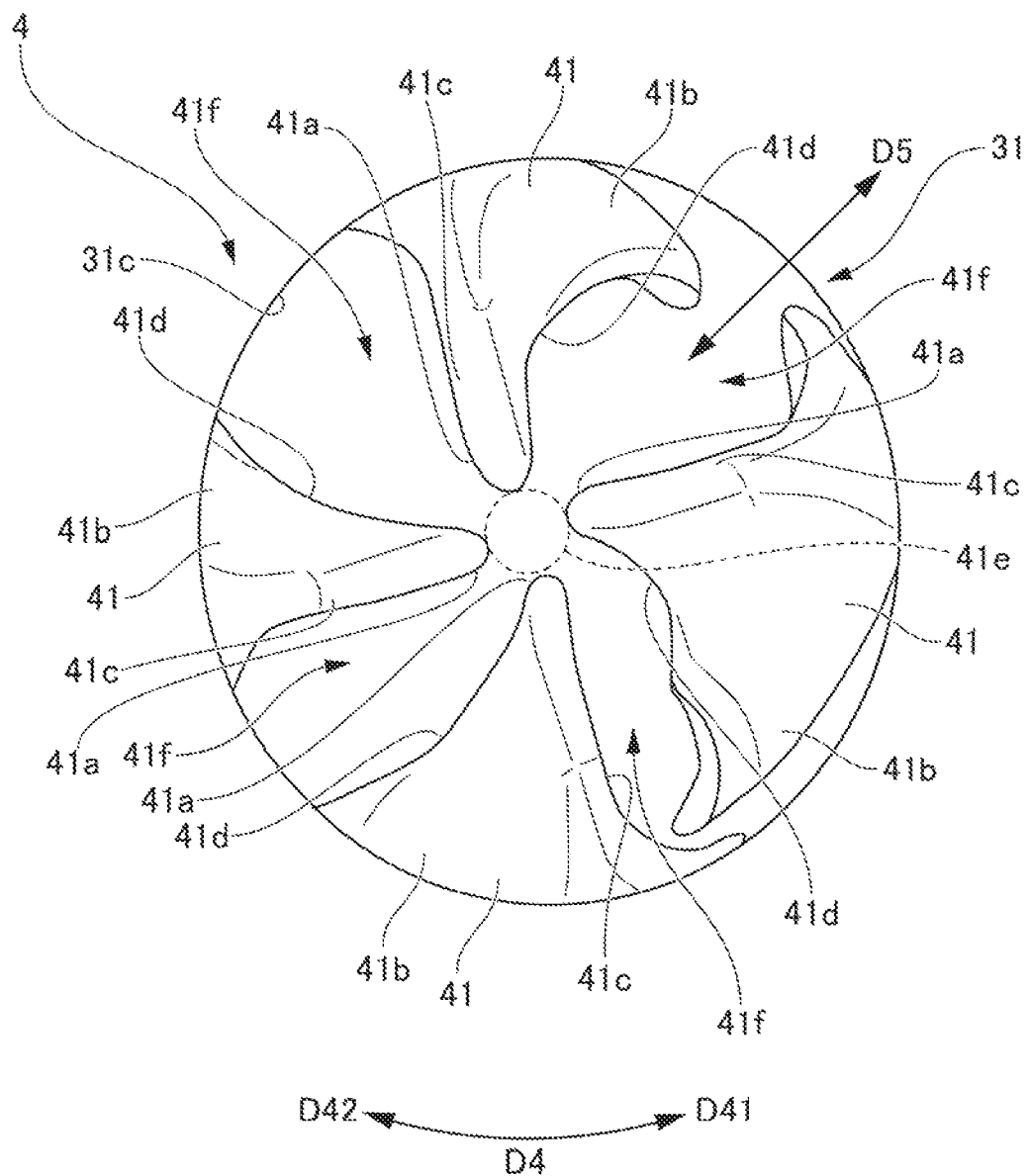
FIG. 4 is a plan view of the swirl generator in the main flow channel pipe when seen from an upstream side of the main flow channel pipes.

The swirl generator 4 according to the present embodiment has, as illustrated in FIGS. 3 and 4, a plurality of deflecting plates 41 each having a blade shape that deflects a flow of the cooling fluid in one of circumferential directions (D4 directions in FIGS. 3 and 4) of each of the main flow channel pipes 31 to generate swirls. These deflecting plates 41 are protrusions provided to protrude from the inner wall surface 31c of each of the main flow channel pipes 31 toward the center, in radial directions (D5 directions in FIG. 4), of each of the main flow channel pipes 31. The swirl generator 4 according to the present embodiment has the four deflecting plates 41. However, the number of the deflecting plates 41 is not limited to four.

The deflecting plates 41 are disposed on the inner wall surface 31c of each of the main flow channel pipes 31 and arranged in the circumferential directions of each of the main flow channel pipes 31. Specifically, the four deflecting plates 41 are arranged in the circumferential directions of the inner wall surface 31c each at an angle of substantially 90°, and are integrally provided to the inner wall surface 31c. The four deflecting plates 41 each protrude from the inner wall surface 31c toward the center, in the radial directions, of each of the main flow channel pipes 31.

The deflecting plates 41 are, as illustrated in FIG. 4, each formed into a tapered shape extending from the inner wall surface 31c to which a base end 41b is coupled toward a tip 41a. Specifically, the deflecting plates 41 are each formed into a triangular shape or a fan shape to make the base end 41b coupled to the inner wall surface 31c wider than the tip 41a disposed adjacent to the center, in the radial directions, of each of the main flow channel pipes 31. As both side edges 41c, 41d of each of the deflecting plates 41 head from the base end 41b toward the tip 41a, they approach to each other and then join with each other at the tip 41a. Since the base end 41b of each of the deflecting plates 41 coupled to the inner wall surface 31c of each of the main flow channel pipes 31 has a wider width, the deflecting plates 41 are stably and firmly attached to each of the main flow channel pipes 31.

Each of the surfaces of the four deflecting plates 41, which extends from the base end 41b to the tip 41a, is curved or inclined in one direction of the circumferential directions of each of the main flow channel pipes 31. Specifically, with respect to the side edge 41c of one of the deflecting plates 41, which is disposed to face one of the circumferential directions (a D41 direction in FIG. 4) of each of the main flow channel pipes 31, the side edge 41d of the one of the deflecting plates 41, which is disposed to face the other one of the circumferential directions (a D42 direction in FIG. 4) of each of the main flow channel pipes 31, is disposed slightly downstream. Thereby, the four deflecting plates 41 each deflect, as illustrated by the arrows in FIG. 3, the flow of the cooling fluid inside each of the main flow channel pipes 31 in the one direction of the circumferential directions of each of the main flow channel pipes 31.

As illustrated in FIG. 4, the tips 41a of the four deflecting plates 41 are not in contact with each other, but are separated from each other. Therefore, the swirl generator 4 has, adjacent to the tips 41a of the four deflecting plates 41, a through flow channel 41e allowing the cooling fluid to flow along the center, in the radial directions, of each of the main flow channel pipes 31. The through flow channel 41e linearly communicates, inside each of the main flow channel pipes 31, an upstream side and a downstream side of the swirl generator 4 with each other.

Furthermore, as illustrated in FIG. 4, when the swirl generator 4 is seen in the axial directions of each of the main flow channel pipes 31, gap flow channels 41f are each formed between each adjacent two of the deflecting plates 41, 41 in the circumferential directions of each of the main flow channel pipes 31. The gap flow channels 41f each linearly communicate, inside each of the main flow channel pipes 31, the upstream side and the downstream side of the swirl generator 4 with each other in extending directions (the D1 directions in FIGS. 2 and 3, vertical directions with respect to the paper plane in FIG. 4) of each of the main flow channel pipes 31. The gap flow channels 41f are each in communication with the through flow channel 41e.

The cooling fluid that has flowed from the inflow-side collecting pipe 32 of the cooling fluid flow channel 3 into each of the main flow channel pipes 31 collides with the four deflecting plates 41 of the swirl generator 4. The cooling fluid that has collided with the deflecting plates 41 is guided by the surfaces of the deflecting plates 41, where swirls that are swirling in the one direction of the circumferential directions of each of the main flow channel pipes 31 (the D42 direction in FIG. 4 in the present embodiment) are generated, and thus passes through the swirl generator 4. Since the swirl generator 4 is disposed adjacent to the upstream-side end 31a of each of the main flow channel pipes 31, the cooling fluid that has flowed into each of the main flow channel pipes 31 flows across the whole length of each of the main flow channel pipes 31 toward the outflow-side collecting pipe 33 while keeping the state of swirling.

It is possible to produce the water jacket 1 as described above by using a laminate forming method that laminate-forms the housing 2 and the cooling fluid flow channel 3 having the swirl generators 4 respectively inside the main flow channel pipes 31 from an identical metal material (for example, metal powder or metal wires). With this production method, it is possible to easily integrally form the housing 2 and the cooling fluid flow channel 3 having the swirl generators 4 respectively inside the main flow channel pipes 31, using a 3D printer. As the metal material, it is possible to use such a metal material that offers higher thermal conductivity such as an aluminum-based material or a copper-based material.

For example, when metal powder is used as a metal material in the laminate forming method (additive manufacturing) using a 3D printer, a step of melting a part that undergoes forming, by irradiating the metal powder spread on a base plate with laser or an electron beam, and then allowing the melted part to coagulate, and a step of moving the base plate to spread again new metal powder are repeated to three-dimensionally laminate-form the water jacket 1 in the D1 directions representing length directions of the main flow channel pipes 31.

The water jacket 1 according to the present embodiment described above leads to the following actions and effects. That is, the present embodiment is directed to the water jacket 1 including the cooling fluid flow channel 3 inside the housing 2 disposed around the outer peripheral surface of the stator core 101 that is regarded as a heat generating part. The cooling fluid flow channel 3 includes: the plurality of main flow channel pipes 31 each disposed adjacent to the outer peripheral surface of the stator core 101, each extending linearly, and each arranged along the outer peripheral surface of the stator core 101; the inflow-side collecting pipe 32 coupling the upstream-side ends 31a of the plurality of main flow channel pipes 31 to each other to allow a cooling fluid to flow thereinto; and the outflow-side collecting pipe 33 coupling the downstream-side ends 31b of the plurality of main flow channel pipes 31 to each other to allow the cooling fluid to flow thereout. The plurality of main flow channel pipes 31 each have, in its inside and adjacent to each of the upstream-side ends 31a, the swirl generator 4 that deflects a flow of the cooling fluid in one of the circumferential directions of each of the main flow channel pipes 31 to generate swirls. The swirl generator 4 has the deflecting plates 41 that are a plurality of protrusions respectively disposed, in the circumferential directions, along the inner wall surface 31c of each of the main flow channel pipes 31 and respectively protruding toward the center, in the radial directions, of each of the main flow channel pipes 31. The plurality of deflecting plates 41 respectively have the tips 41a being separated from each other to have, adjacent to the tips 41a of the plurality of deflecting plates 41, the through flow channel 41e allowing the cooling fluid to flow along the center, in the radial directions, of each of the main flow channel pipes 31.

According to this configuration, the cooling fluid that has passed through the swirl generator 4, in which the state of swirling is attained, swirls and flows in each of the main flow channel pipes 31, while going back and forth between the side proximal to the stator core 101 and the side distal from the stator core 101. Therefore, the cooling fluid is able to effectively exchange heat with the stator core 101 that is regarded as a heat generating part across the whole length of each of the main flow channel pipes 31. Since the temperature gradient between the side proximal to the stator core 101 and the side distal from the stator core 101 is considerably reduced in each of the main flow channel pipes 31, it is possible to improve the thermal transfer of the cooling fluid flow channel 3, further improving the cooling efficiency of the stator core 101 that is regarded as a heat generating part.

Furthermore, since the swirl generator 4 has the through flow channel 41e adjacent to the tips 41a of the four deflecting plates 41, the centers of swirls that are generated in the cooling fluid passing through the swirl generator 4 are able to smoothly flow, in the through flow channel 41e, from the upstream side toward the downstream side. Since resistance when the cooling fluid entering the flow channel passes through the swirl generator 4 is reduced, for example, concentrated stress generated at the deflecting plates 41 due to external forces applied to the housing 2 itself is suppressed, improving the durability of the deflecting plates 41. Therefore, it is possible to provide the highly durable, high quality water jacket 1.

In the present embodiment, the plurality of deflecting plates 41 are each formed into a tapered shape extending from the inner wall surface 31c of the main flow channel pipe 31 toward the tip 41a. According to this configuration, resistance when the cooling fluid entering the flow channel passes through the swirl generator 4 is further reduced. Therefore, the cooling fluid is able to further smoothly pass through the main flow channel pipes 31.

In the present embodiment, the swirl generator 4 has, between each adjacent two of the deflecting plates 41, 41 in the circumferential directions of each of the main flow channel pipes 31, the gap flow channel 41f communicating the upstream side and the downstream side of the swirl generator 4 in the extending directions of each of the main flow channel pipes 31 and being in communication with the through flow channel 41e. According to this configuration, resistance when the cooling fluid entering the flow channel passes through the swirl generator 4 is further reduced. Therefore, the cooling fluid is able to further smoothly pass through the main flow channel pipes 31.

With the production method for the water jacket 1, according to the present embodiment, a metal material is used in laminate forming to integrally form the water jacket. According to this configuration, it is possible to easily produce, using a 3D printer, the water jacket 1 that makes it possible to further improve the cooling efficiency of the stator core 101. Swirls to be generated in the main flow channel pipes 31 by the swirl generators 4 improve ease of removal of metal material remaining in the cooling fluid flow channel 3 after being formed.

The water jacket 1 according to the present embodiment described above is provided as a single water jacket only and is positioned around the outer peripheral surface of the stator core 101 that is regarded as a heat generating part. However, when the stator core 101 is further longer in length in the axial directions, for example, two or more water jackets 1 may be provided in a stacked manner in the axial directions of the stator core 101.

The water jacket 1 according to the present embodiment described above has been provided in the electric motor 100 in which the stator core 101 is regarded as a heat generating part. However, the heat generating part is not limited to the electric motor 100. It is possible to provide the water jacket 1 to various heat generating parts requiring cooling by a cooling fluid.

EXPLANATION OF REFERENCE NUMERALS

1 Water jacket
2 Housing
3 Cooling fluid flow channel
31 Main flow channel pipe
31a Upstream-side end
31b Downstream-side end
31c Inner wall surface
32 Inflow-side collecting pipe
33 Outflow-side collecting pipe
4 Swirl generator
41 Deflecting plate (protrusion)
41a Tip
41e Through flow channel
41f Gap flow channel
101 Stator core (heat generating part)

What is claimed is:

1. A water jacket comprising a cooling fluid flow channel inside a housing disposed around an outer surface of a heat generating part,
the cooling fluid flow channel including:
a plurality of main flow channel pipes each disposed adjacent to the outer surface of the heat generating part, each extending linearly, and each arranged along the outer surface of the heat generating part;
an inflow-side collecting pipe coupling upstream-side ends of the plurality of main flow channel pipes to each other to allow a cooling fluid to flow thereinto; and
an outflow-side collecting pipe coupling downstream-side ends of the plurality of main flow channel pipes to each other to allow the cooling fluid to flow thereout,
the plurality of main flow channel pipes each having, in its inside and adjacent to each of the upstream-side ends, a swirl generator that deflects a flow of the cooling fluid in one of circumferential directions of each of the main flow channel pipes to generate swirls,
the swirl generator having a plurality of protrusions respectively disposed, in the circumferential directions, along an inner wall surface of each of the main flow channel pipes and respectively protruding toward a center, in radial directions, of each of the main flow channel pipes, the plurality of protrusions respectively having tips being separated from each other to have, adjacent to the tips of the plurality of protrusions, a through flow channel allowing the cooling fluid to flow along the center, in the radial directions, of each of the main flow channel pipes.

2. The water jacket according to claim 1, wherein the plurality of protrusions are each formed into a tapered shape extending from the inner wall surface of each of the main flow channel pipes toward the tip.

3. The water jacket according to claim 1, wherein the swirl generator has, between each adjacent two of the protrusions in the circumferential directions of each of the main flow channel pipes, a gap flow channel communicating an upstream side and a downstream side of the swirl generator in extending directions of each of the main flow channel pipes and being in communication with the through flow channel.

4. A water jacket production method using a metal material in laminate forming to integrally form the water jacket according to claim 1.

* * * * *